United States Patent
Nakaso et al.

(10) Patent No.: US 7,534,986 B2
(45) Date of Patent: May 19, 2009

(54) OPTICAL WIRELESS TRANSMISSION SYSTEM

(75) Inventors: Mariko Nakaso, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 11/790,449

(22) Filed: Apr. 25, 2007

(65) Prior Publication Data

US 2007/0253716 A1 Nov. 1, 2007

(30) Foreign Application Priority Data

Apr. 27, 2006 (JP) .............................. 2006-124299

(51) Int. Cl.
*H04B 10/00* (2006.01)

(52) U.S. Cl. ..................... 250/216; 398/122; 398/158; 385/24

(58) Field of Classification Search .......... 250/216, 250/574, 575, 227.28; 385/15, 24, 53; 398/122, 398/127, 128, 129, 130, 131

See application file for complete search history.

(56) References Cited

U.S. PATENT DOCUMENTS

| | | | | |
|---|---|---|---|---|
| 6,775,480 | B1 * | 8/2004 | Goodwill | 398/158 |
| 2004/0208596 | A1 * | 10/2004 | Bringans et al. | 398/130 |

FOREIGN PATENT DOCUMENTS

| | | |
|---|---|---|
| JP | 08-237204 | 9/1996 |
| JP | 2002-111585 | 4/2002 |

\* cited by examiner

*Primary Examiner*—Georgia Y Epps
*Assistant Examiner*—Tony Ko
(74) *Attorney, Agent, or Firm*—Wenderoth, Lind & Ponack, L.L.P.

(57) ABSTRACT

A light emission section, including a light emitting element such as a semiconductor laser, emits a light beam in accordance with communication data. A light reception section, including a light receiving element such as a photodiode, receives the light beam emitted by the light emission section. The light emission section and the light reception section are positioned and an emission angle and an incidence angle of the light beam are determined such that the light beam emitted by the light emission section to the light reception section is prevented from being reflected by a surface of the optical reception section and/or a mounting substrate and being returned to the light emission section.

9 Claims, 17 Drawing Sheets

OPTICAL WIRELESS TRANSMISSION SYSTEM

BACKGROUND OF THE INVENTION

1. Field of the Invention

The present invention relates to an optical wireless transmission system for performing data communication using a light beam which is transmitted in an optical space, and more particularly to an optical wireless transmission system capable of reducing degradation of transmission characteristic caused by unnecessary reflection of a light beam.

2. Description of the Background Art

In recent years, optical wireless transmission technology for performing data communication by emitting a light beam into free space has been attracting attention, since, for example, the optical wireless transmission technology allows an information processing terminal or an AV equipment to be connected to another device in an office or at home without using a cable, and is expected to realize high speed communication utilizing broadband performance of a light. Further, as compared to a communication method for performing radio communication by using a wireless LAN or UWB, the optical wireless transmission is greatly advantageous in that a frequency to be used is not legally restricted. And, confidentiality and security are ensured since, for example, the optical wireless transmission enables enhancement of a directivity and exerts no influence on a neighboring wireless network.

Recently, an optical wireless transmission system capable of transmitting an increased volume of data at an increasingly enhanced speed has been required.

However, in order to perform data communication at an enhanced speed, it is necessary to provide a light source (light emitting element) and a light receiving element each of which enables high speed response and an enhanced performance. In particular, the light receiving element is required to have a reduced parasitic capacitance so as to represent an enhanced frequency response characteristic, and therefore it is necessary to reduce a light receiving area thereof. For example, the diameter of the light receiving element for 1.25 Gbps data communication is 200 μm and the diameter of the light receiving element for 10 Gbps data communication is 60 μm (as of February in 2006, according to Albis Optoelectronics AG)

However, in an optical wireless transmission system, reduction of the light receiving area of the light receiving element leads to reduction of total light receiving power, and therefore it is difficult to perform high speed transmission.

Therefore, in order to solve this problem, a multiplex transmission method is suggested in which parallel data communication is performed by using a plurality of light sources and a plurality of light receiving elements so as to enhance an entire transmission rate. See, for example, Japanese Laid-Open Patent Publication No. 8-237204 (Patent Document 1) (page 8, FIG. 1). This method uses a plurality of optical links so as to reduce a transmission rate for each optical link.

FIG. 16 is a diagram illustrating a structure of a conventional optical space connection device disclosed in Patent Document 1. Patent Document 1 discloses a technology for performing a signal transmission in a computer or a communication processing device, and this technology is also applicable to an optical wireless transmission system.

In FIG. 16, a plurality of electrical signals are inputted to an optical transmitter module 30, and the plurality of electrical signals are converted into optical signals, respectively, by an LD driver array 32 and a light emitting element array 33, and a collimator lens 34 converts the optical signals into light beams, respectively, having different angles from each other, thereby emitting the light beams into space. The optical receiver module 35 receives, through a collecting lens 39, the light beams such that the light receiving elements of the light receiving element array 38 collect the light beams so as to generate optical signals, respectively, in accordance with incidence angles of the light beams. The light receiving element array 38 converts the received optical signals into electrical signals, respectively, and outputs the electrical signals to an amplifier array 37. Thereafter, the amplifier array 37 amplifies the electrical signals, and outputs the amplified electrical signals from the optical receiver module 35.

In the conventional optical free-space connection device, positions of the light emitting elements aligned on the focal plane viewed from the collimator lens 34 represent emission angles of the respective light beams outputted through the collimator lens 34. Further, positions at which the light beams incident on the optical receiver module 35 are collected on a light receiving surface depend on the incidence angles of the light beams. That is, in the conventional optical free-space connection device, positions at which the elements of the light emitting element array 33 are aligned are represented as angular information representing emission angles of the light beams, and the angular information is transmitted after a process of the representation. Therefore, even in a case where a positional relationship between the optical transmitter module and the optical receiver module is changed, when the collecting lens 39 is allowed to collect the light beams, no influence is exerted on the positions at which the light beams are collected on the light receiving surface. Therefore, in the invention disclosed in Patent Document 1, a tolerance for changes of the positional relationship between modules is improved as compared to a device using a conventional lens array.

However, the structure shown in FIG. 16 is disadvantageous in that the numbers of light sources and light receiving elements are increased, and therefore mounting areas of the light sources and the light receiving elements are increased, thereby increasing the sizes of the collimator lens 34 and the collecting lens 39. Further, the light beams emitted from the light emitting element array 33 are incident on the collimator lens 34 so as to be perpendicular thereto. Therefore, a returned reflected light is incident on the light emitting element array 33, which leads to unstable operation of the light emitting element array 33. When the light beams are incident on the light receiving element array 38, a portion of the light beams may be reflected by the surfaces of the light receiving elements, and the reflected light is further reflected by a surface of the collecting lens 39 so as to be incident on the light receiving element array 38. The light having been repeatedly reflected results in delayed signals. Therefore, the higher a data rate is, the larger this problem is.

Thus, in the optical wireless transmission system, transmission quality is influenced by the reflected light which is returned from a reflection point in an optical transmission line, and the repeated reflections.

In order to prevent the influence of the reflected light, a technique of allowing a receiver to perform noise-cancellation is suggested. See, for example, Japanese Laid-Open Patent Publication No. 2002-111585 (Patent Document 2) (page 10, FIG. 1).

FIG. 17 is a diagram illustrating a structure of a conventional optical wireless transmission system disclosed in Patent Document 2.

As shown in FIG. 17, an optical transmitter 44 of a main unit 41 transmits light signals LPa and LPb each having a different light emission spectrum, from a LED 54 and a LED 55, respectively, so as to be in phase with each other, depending on a signal P to be transmitted. An optical receiver 46 of a sub-unit 42 subjects the light signals LPa and LPb to photoelectric conversion by using a PD 67, and an operational amplifier 68 extracts only the signal P. Further, a signal transmitter 45 of the sub-unit 42 differentially transmits light beams −LCb and LCa each having a different light emission spectrum, from a LED 61 and a LED 63, respectively, depending on a signal C to be transmitted. An optical receiver 43 of the main unit 41 subjects to photoelectric conversion the transmission light beams −LCb and LCa by using a PD 52 and a PD 53, in accordance with the light emission spectrum, and an operational amplifier 51 extracts only the signal C.

Accordingly, a signal transmitted from the PD 52 of the optical receiver 43 to an inverting input terminal of the operational amplifier 51 is a signal (N+(−C)+P) obtained by superimposing, on a signal (−C) obtained by subjecting to photoelectric conversion the transmission light beam (−LCb) transmitted by the optical transmitter 45, a noise component (N) generated by subjecting an ambient light LN to photoelectric conversion, and a noise component (P) obtained by subjecting to photoelectric conversion a light obtained by reflecting, by a reflector 47, the transmission light LPb transmitted from the optical transmitter 44. On the other hand, a signal transmitted from the PD 53 of the optical receiver 43 to a non-inverting input terminal of the operational amplifier 51 is a signal (N+C+P) obtained by superimposing, on a signal (+C) obtained by subjecting to photoelectric conversion the transmission light beam (LCa) transmitted by the optical transmitter 45, a noise component (N) generated by subjecting the ambient light LN to photoelectric conversion, and a noise component (P) obtained by subjecting to photoelectric conversion a light obtained by reflecting, by the reflector 47, the transmission light LPa transmitted from the optical transmitter 44.

The operational amplifier 51 subtracts an output signal (N+C+P) received from the PD 52 at the inverting input terminal thereof, from an output signal (N+(−C)+P) received from the PD 53 at the non-inverting input terminal. That is, the operational amplifier 51 performs a calculation (N−N+C−(−C)+P−P=2C).

That is, a result of the calculation indicates that a signal transmitted through the terminal 54 from the operational amplifier 51 to a signal processor following thereto corresponds to a signal (2C) obtained by completely eliminating the noise component (N) generated from the ambient light LN, and the noise component (P) generated from the light reflected by the reflector 47.

However, in the conventional optical wireless transmission system disclosed in Patent Document 2, it is necessary to position the LED 54 and the LED 55 of the optical transmitter 44 of the main unit 41 close to each other so as to allow complete accurate elimination of the noise component (N) and the noise component (P) from a signal to be outputted by the operational amplifier 51. If the LED 54 and the LED 55 are not positioned close to each other, the transmission light beams transmitted from the respective light sources are incident on the reflector under different conditions from each other (for example, an incidence angle and/or an incident power are different among the transmission light beams), whereby each of the transmission light beams has a different reflected light power. Further, the transmission light beams are transmitted through the reflector to the PD in optical paths having lengths different from each other, and therefore a magnitude and/or a phase of the noise component (P) generated from the reflected light which is incident on the PD 52 and the PD 53 of the optical receiver 43 of the main unit 41 is different among the transmission light beams. Therefore, the noise component is not completely eliminated through the calculation.

Further, in the conventional optical wireless transmission system disclosed in Patent Document 2, an output signal obtained by the sub-unit 42 is 2P corresponding to a signal obtained by doubling the output signal P obtained by one LED. However, when the LED 54 and the LED 55 are positioned close to each other so as to attain a purpose described above, emission intensity density of the light beam is increased, and therefore it is necessary to reduce an output power of each LED or reduce the emission intensity density of the light beam by using a diffuser or the like so as to satisfy eye-safe conditions, so that it is not easy to simply obtain an output signal of a high intensity.

As described above, the conventional optical wireless transmission system disclosed in Patent Document 2 is disadvantageous in that, while an increased number of components, such as an arithmetic circuit for noise cancellation and the increased number of light sources, that is, two light sources of different wavelengths, are provided as compared to the numbers of light sources and components of a typical optical wireless transmission system, a data transmission speed is not sufficiently enhanced.

SUMMARY OF THE INVENTION

Therefore, an object of the present invention is to provide an optical wireless transmission system capable of preventing a light beam emitted by a light emitting element from being returned to the light emitting element due to reflection, and from being incident on a light receiving element other than a target light receiving element, so as to realize stable high speed data communication.

The present invention is directed to an optical wireless transmission system for performing data communication by using a light beam transmitted in free space. In order to attain the object mentioned above, the optical wireless transmission system of the present invention comprises: a transmission terminal having at least one light emission section operable to emit a light beam; a reception terminal having at least one light reception section operable to receive the emitted light beam; and a terminal fixing auxiliary component for allowing the transmission terminal and the reception terminal to be mounted thereon, and fixing the at least one light emission section and the at least one light reception section so as to satisfy a predetermined positional relationship therebetween. Further, when the transmission terminal and the reception terminal are mounted on the terminal fixing auxiliary component, the at least one light emission section and the at least one light reception section are positioned such that the light beam emitted by the at least one light emission section is prevented from being reflected by the at least one light reception section and being returned to the at least one light emission section.

For example, in a case where the at least one light emission section and the at least one light reception section are positioned in parallel with and face-to-face with each other by mounting the transmission terminal and the reception terminal on the terminal fixing auxiliary component, when a distance, in a perpendicular direction, between a light emission section and a light reception section operating in conjunction with each other, is L, a distance, in a parallel direction, between the light emission section and the light reception section operating in conjunction with each other, is W, and a directivity angle of the light beam is θ, an illuminating angle α of the light beam emitted by the light emission section with respect to the perpendicular direction between the transmission terminal and the reception terminal satisfies an expression (1) described in the embodiments.

Typically, each light emission section includes a light emitting element operable to emit light in accordance with communication data, and an optical fiber, connected to the light emitting element, operable to collect the light emitted by the light emitting element so as to emit the light beam. Alternatively, each light emission section includes a light emitting element operable to emit light in accordance with communication data, and an optical wave guide substrate, connected to the light emitting element, operable to emit, as the light beam, the light emitted by the light emitting element via an optical wave guide.

When the at least one light emission section emits a plurality of light beams, the reception terminal may further include a lens operable to collect the plurality of light beams which are incident thereon, and the at least one light reception section may include at least one light receiving element operable to receive the plurality of light beams collected by the lens. Alternatively, the reception terminal may further include a lens operable to collect the plurality of light beams which are incident thereon, and the at least one light reception section may include at least one wavelength filter operable to pass only a light beam of a predetermined wavelength among the plurality of light beams collected by the lens, and at least one light receiving element operable to receive only the light beam which has passed through the at least one wavelength filter. When a wavelength of the light beam emitted by each light emission section is $\lambda_n$, a directivity angle of the light beam is $\theta_n$, and an incidence angle at which the light beam is incident on the at least one light reception section is $\alpha_n$, an allowable passband $\Delta\lambda$ of the wavelength filter satisfies an expression (2) described in the embodiments.

Preferably, the reception terminal may further include at least one second light emission section operable to emit a light beam, and the transmission terminal may further include at least one second light reception section operable to receive the light beam emitted by the reception terminal. Also in this case, when the transmission terminal and the reception terminal are mounted on the terminal fixing auxiliary component, the at least one second light emission section and the at least one second light reception section may be positioned such that the light beam emitted by the at least one second light emission section is prevented from being reflected by the at least one second light reception section and being returned to the at least one second light emission section.

Further, at least two of a plurality of light beams emitted by the at least one light emission section may be collected by any one of the at least one light reception section, and when a distance between any two light emission sections among the at least one light emission section is d, which is larger than 0.15 mm, a distance L from the two light emission sections to an intersection of optical axes of the light beams emitted by the two light emission sections preferably satisfies an expression (3) described in the embodiments.

The terminal fixing auxiliary component for fixing the at least one light emission section and the at least one light reception section so as to satisfy a predetermined positional relationship therebetween may be integrated into one of the transmission terminal or the reception terminal instead of the terminal fixing auxiliary component being independently provided.

According to the present invention, it is possible to prevent a light beam emitted by the light emitting element from being returned to the light emitting element due to reflection. Thus, it is possible to obtain a preferable transmission characteristic in a simplified manner, and realize stable high speed data communications.

These and other objects, features, aspects and advantages of the present invention will become more apparent from the following detailed description of the present invention when taken in conjunction with the accompanying drawings.

DESCRIPTION OF THE PREFERRED EMBODIMENTS

A technology of the present invention is applicable to various optical wireless transmission systems each of which transmits and receives a light beam through free space, and an example where the technology of the present invention is applied to optical wireless transmission systems shown in FIGS. 1 and 2 will be described.

Figure 1:
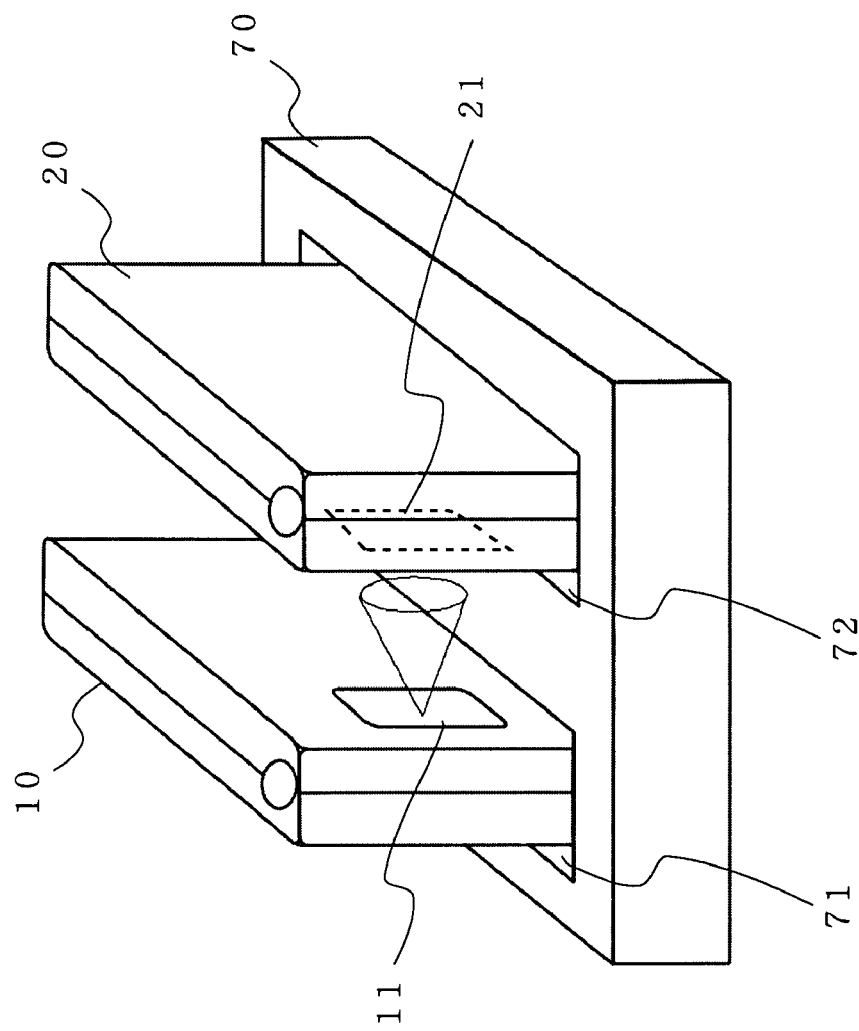
FIGS. 1 and 2 are diagrams each illustrating an example where an optical wireless transmission system according to the present invention is applied.

The optical wireless transmission system shown in FIG. 1 comprises a transmission terminal 10 and a reception terminal 20 (both of which may be a mobile terminal, or the like), and a terminal fixing auxiliary component 70. The transmission terminal 10 includes an optical transmission section 11 for optically transmitting data. The reception terminal 20 includes an optical reception section 21 for optically receiving data. The terminal fixing auxiliary component 70 includes a guide 71 for mounting the transmission terminal 10 thereon, and a guide 72 for mounting the reception terminal 20 thereon.

Figure 2:
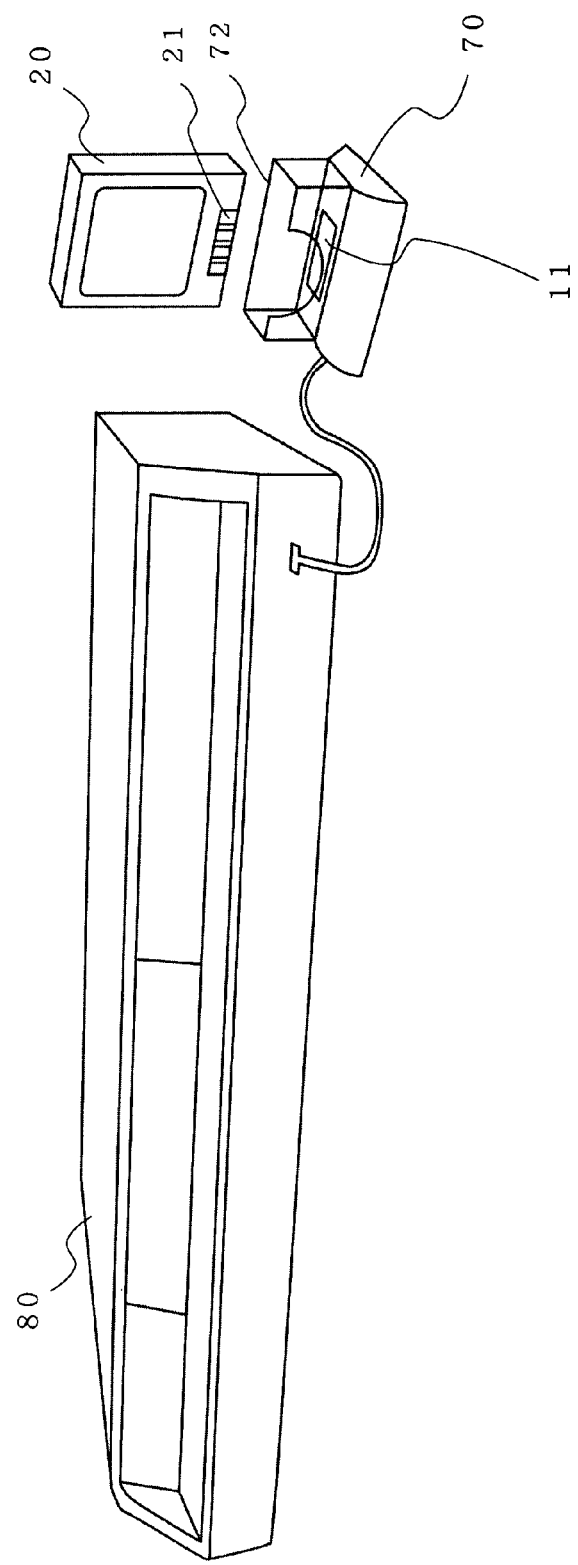

Further, the optical wireless transmission system shown in FIG. 2 comprises the reception terminal 20 (for example, a mobile terminal), and the terminal fixing auxiliary component 70 connectable to a data storage device 80 (for example, a DVD recorder) corresponding to the transmission terminal 10. The reception terminal 20 includes the optical reception section 21 for optically receiving data. The terminal fixing auxiliary component 70 includes the optical transmission section 11 for optically transmitting data stored in the data storage device 80, and the guide 72 for mounting the reception terminal 20 thereon.

The terminal fixing auxiliary component 70 may be integrated into the data storage device 80.

According to the present invention, the system shown in FIG. 1 allows the optical transmission section 11 and the optical reception section 21 to be properly positioned in a foolproof manner simply by mounting the transmission terminal 10 and the reception terminal 20 on the terminal fixing auxiliary component 70. Also, when the optical transmission section 11 is integrated into the terminal fixing auxiliary component 70 as in the system shown in FIG. 2, the optical transmission section 11 and the optical reception section 21 are properly positioned in a foolproof manner simply by mounting the reception terminal 20 on the terminal fixing auxiliary component 70. When the terminal or the terminals are mounted on the terminal fixing auxiliary component 70, a distance between the optical transmission section 11 and the optical reception section 21 is about several millimeters to several tens of centimeters.

Hereinafter, various characteristic structures of the present invention which are applied to the optical wireless transmission system shown in FIG. 1 will be described in detail in an orderly manner. The figures for the respective embodiments each show a positional relationship between the transmission terminal 10 and the reception terminal 20 when the transmission terminal 10 and the reception terminal 20 are mounted on the terminal fixing auxiliary component 70 (not shown).

First Embodiment

Figure 3:
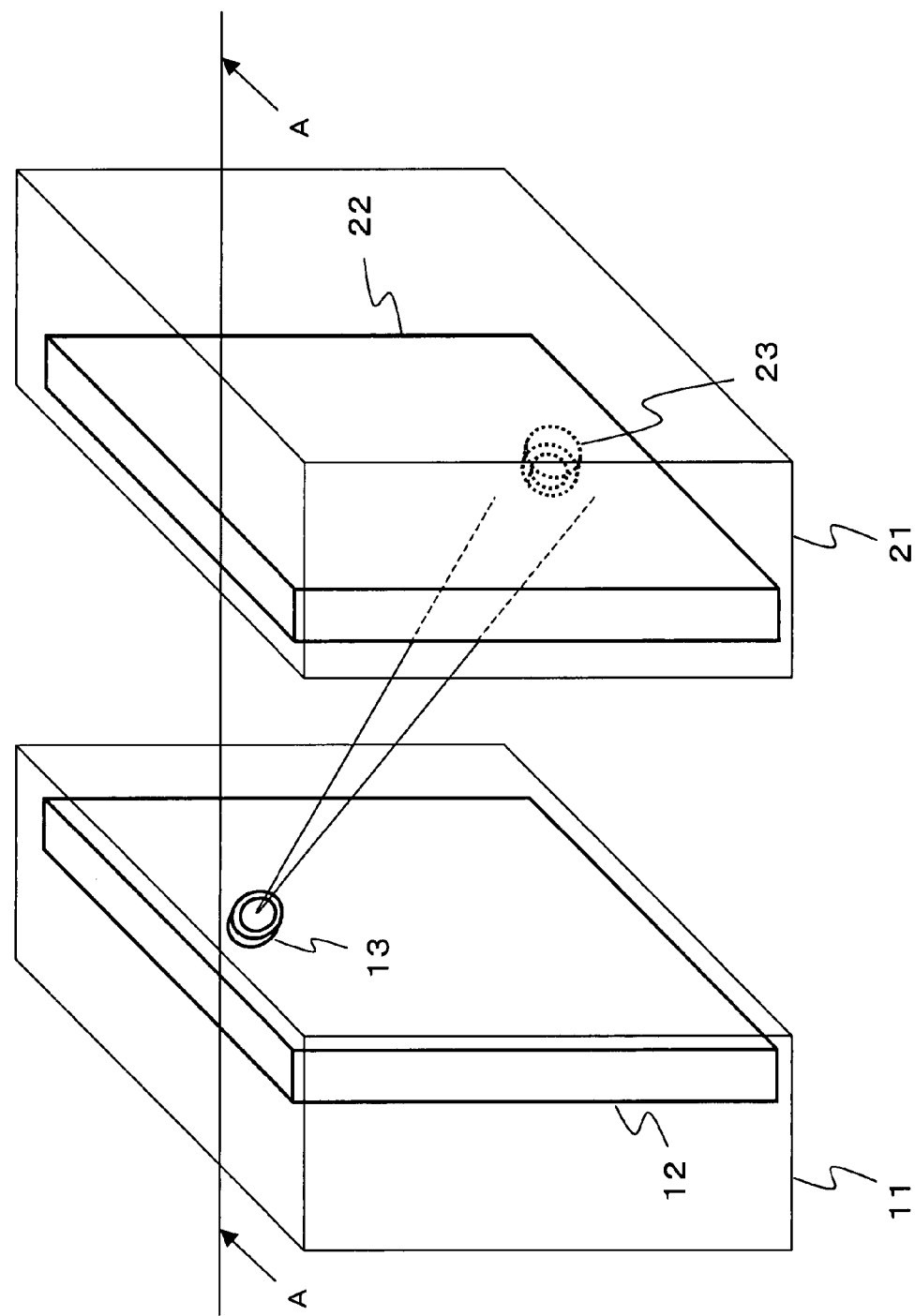
FIG. 3 is a perspective view illustrating an optical wireless transmission system according to a first embodiment of the present invention.
Figure 4:
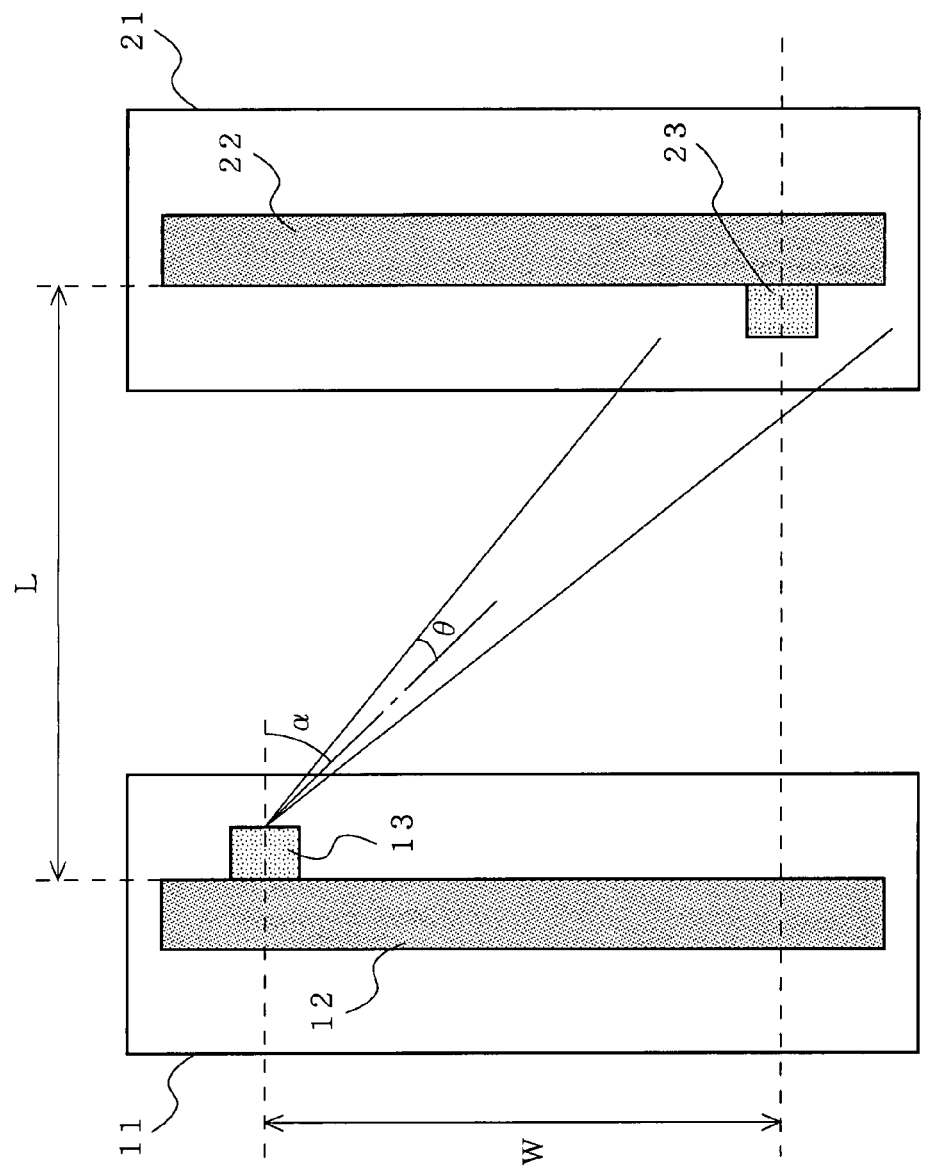
FIG. 4 is a cross-sectional view illustrating a structure of the optical wireless transmission system according to the first embodiment of the present invention.

FIG. 3 is a perspective view illustrating the optical wireless transmission system according to a first embodiment of the present invention. FIG. 4 is a cross-sectional view along lines A-A illustrating the optical wireless transmission system shown in FIG. 3. As shown in FIGS. 3 and 4, the optical transmission section 11 of the transmission terminal 10 has a light emission section 13 provided on a mounting substrate 12. The optical reception section 21 of the reception terminal 20 has a light reception section 23 provided on a mounting substrate 22.

The light emission section 13, including a light emitting element such as a semiconductor laser, emits a light beam based on communication data. The light reception section 23, including a light receiving element such as a photodiode, receives the light beam emitted by the light emission section 13. According to the present invention, the light emission section 13 and the light reception section 23 are positioned and an emission angle and an incidence angle of the light beam are determined such that the light beam emitted from the light emission section 13 toward the light reception section 23 is prevented from being reflected by a surface of the optical reception section 21 or a surface of the mounting substrate 22 and returned to the light emission section 13.

For example, a case where the terminal fixing auxiliary component 30 allows the optical transmission section 11 of the transmission terminal 10 and the optical reception section 21 of the reception terminal 20 to be positioned in parallel with and face-to-face with each other as in the optical wireless transmission system shown in FIG. 4, will be described. In this case, when a distance, in the perpendicular direction, between the light emission section 13 and the light reception section 23 operating in conjunction with each other, is "L", and a distance, in the parallel direction, between the light emission section 13 and the light reception section 23 operating in conjunction with each other, is "W", and a directivity angle of a light beam is "θ", an illuminating angle "α" of the light beam emitted from the light emission section 13 with respect to the perpendicular direction between the transmission terminal 10 and the reception terminal 20 satisfies the following expression (1).

$$\alpha > \tan^{-1}(W/2L) + \theta \qquad (1)$$

The structure as described above enables a stable optical transmission even when used is a light emitting element, such as a DFB (Distributed Feedback) laser or VCSEL (Vertical Cavity Surface Emitting Laser), which is likely to exhibit unstable operation due to a returned reflected light.

Next, an exemplary structure of the light emission section 13 for satisfying expression (1) as described above will be specifically described.

Figure 5:
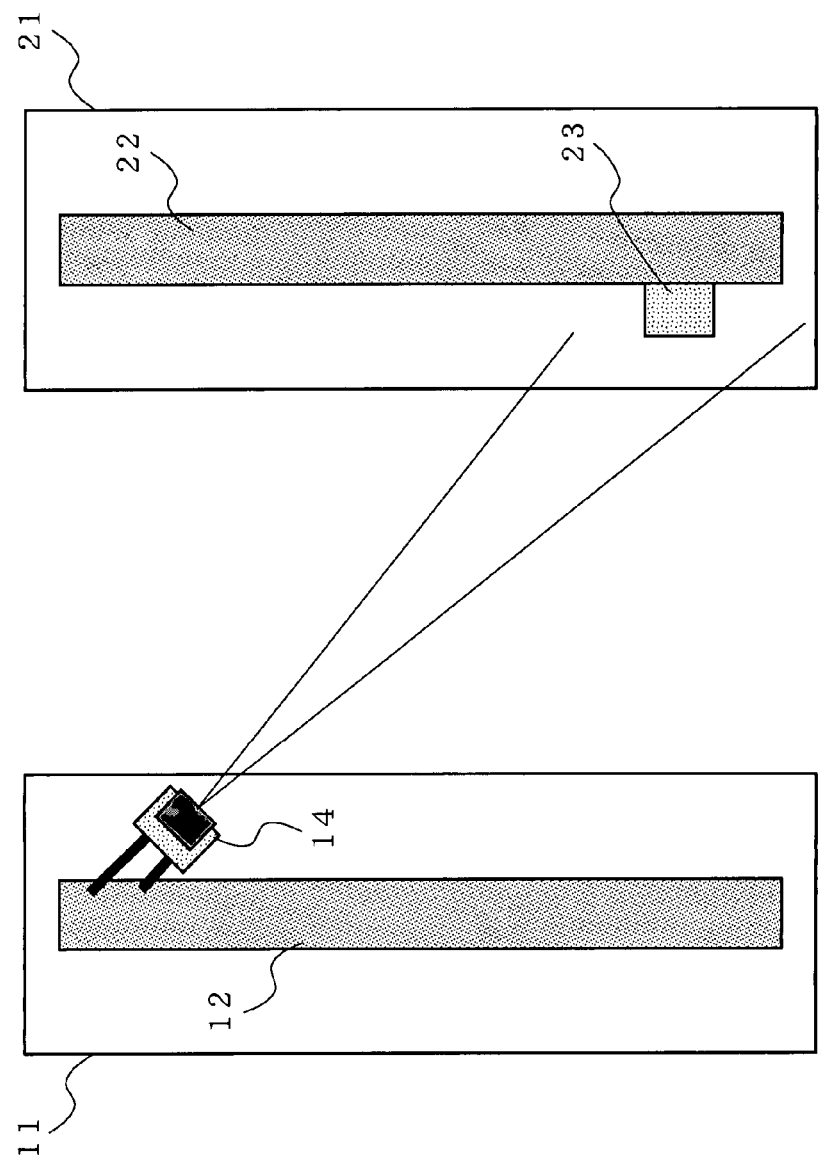
FIGS. 5 through 7 are cross-sectional views illustrating structures of transmission terminals 10 including light emission sections 13 of structure examples 1 to 3, respectively.
Figure 6:
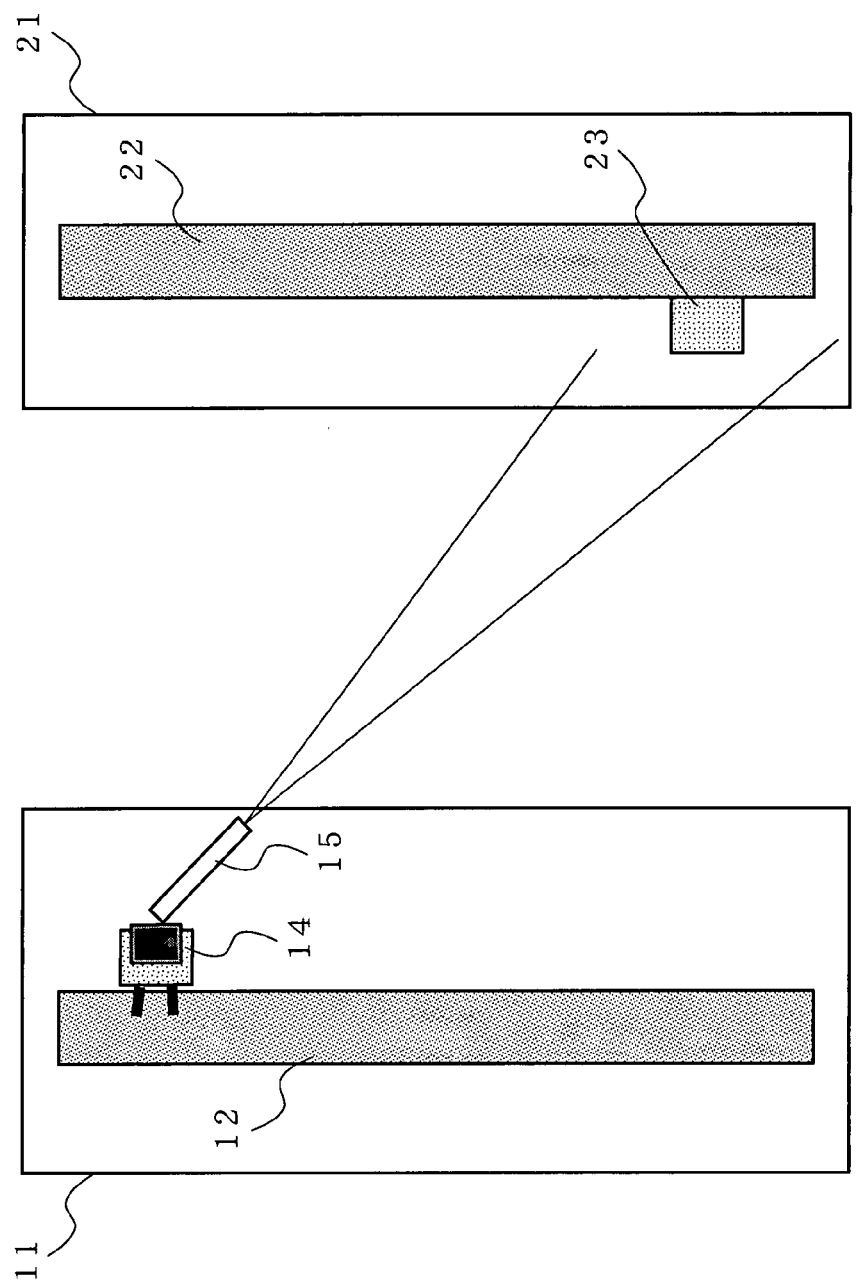
Figure 7:
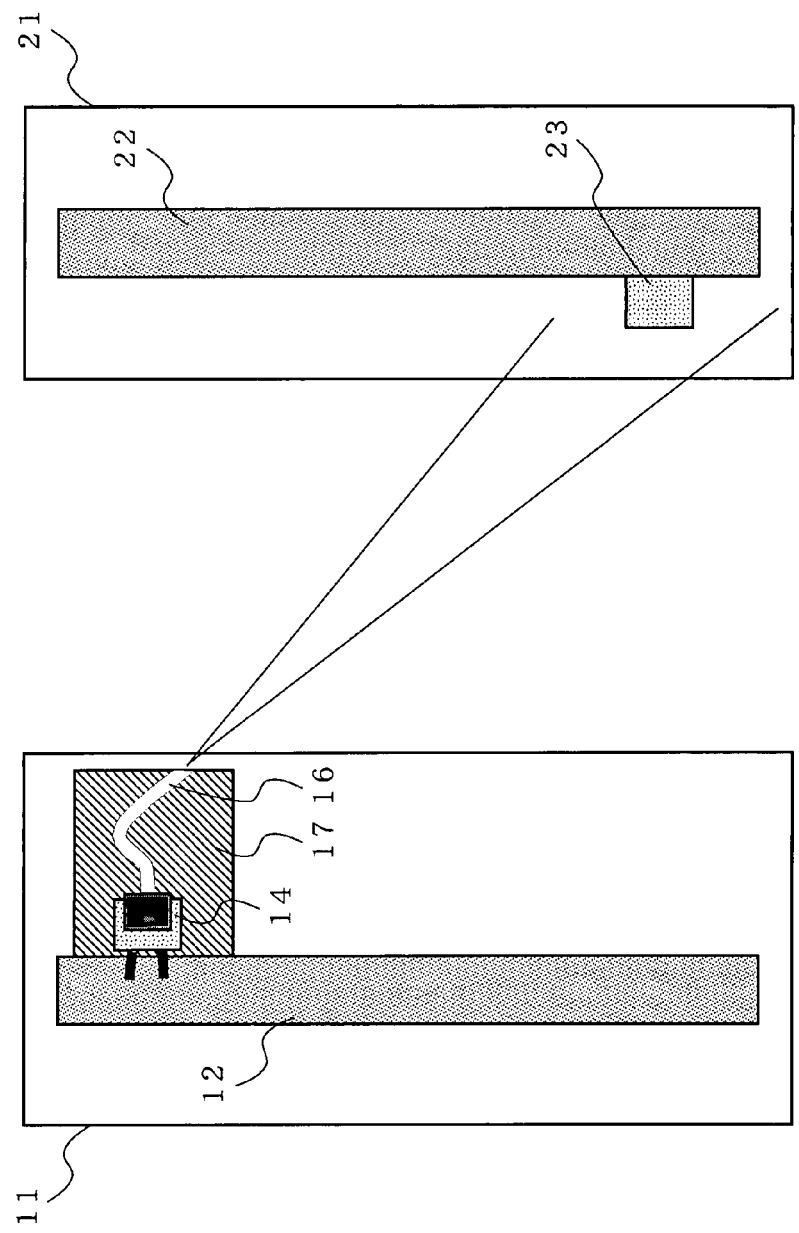

FIGS. 5 through 7 are cross-sectional views illustrating structures of the transmission terminals 10 including the light emission sections 13 of structure examples 1 to 3, respectively.

(1) Structure Example 1

In structure example 1, the light emitting element 14 corresponding to the light emission section 13 is previously tilted with respect to the mounting substrate 12, as shown in FIG. 5. This structure allows the illumination direction of the light beam to be easily changed. When the mounted light emitting element 14 is not fixed in a stable manner, a component for supporting the light emitting element 14 may be additionally provided.

(2) Structure Example 2

In structure example 2, the light emitting element 14 is mounted on the mounting substrate 12 in a normal state, and an optical fiber 15 is connected to the light emitting element 14 so as to be tilted with respect to the light emitting element 14, as shown in FIG. 6. This structure allows the illumination direction to be easily changed. A component for supporting the optical fiber 15 may be additionally provided such that the optical fiber 15 is fixed to the light emitting element 14. A light emission end face of the optical fiber 15 may be ground so as to be beveled at about 7 degrees such that the returned reflected light is prevented from being returned to the light emitting element 14.

In general, when wiring between a light emitting element and a driving circuit for the light emitting element is elongated, the characteristics for high speed modulation are degraded. When the light emitting element 14 is mounted on the mounting substrate 12 so as to be tilted as in structure example 1, one of the lead wires is elongated. However, when the optical fiber 15 is used as in structure example 2, the wiring can be shortened, thereby reducing the degradation of the transmission characteristics for high speed data transmission.

(3) Structure Example 3

In structure example 3, the light emitting element 14 is mounted on the mounting substrate 12 in a normal state, and an optical wave guide substrate 17 having an optical wave guide 16 tilted is connected to the light emitting element 14, as shown in FIG. 7. This structure allows the illumination direction to be easily changed.

In general, when the optical fiber 15 is provided inside the transmission terminal 10 as in structure example 2, the size of the transmission terminal 10 is increased due to the optical fiber 15 having an extra length. However, the optical wave guide 16 is used as in structure example 3, thereby reducing the size of the transmission terminal 10.

The structures according to the first embodiment each allow a light beam emitted by the light emission section 13 from being reflected by the light reception section 23 and the like and returned to the light emission section 13. Thus, stable high speed data communication is able to be realized in a simplified manner.

Second Embodiment

In the first embodiment, a structure in which the optical transmission section 11 includes one light emission section 13, and the optical reception section 21 includes one light reception section 23 is described.

In a second to a seventh embodiments described below, the optical transmission section 11 includes a plurality of light emission sections 13, and the optical reception section 21 includes a plurality of light reception sections 23.

Figure 8:
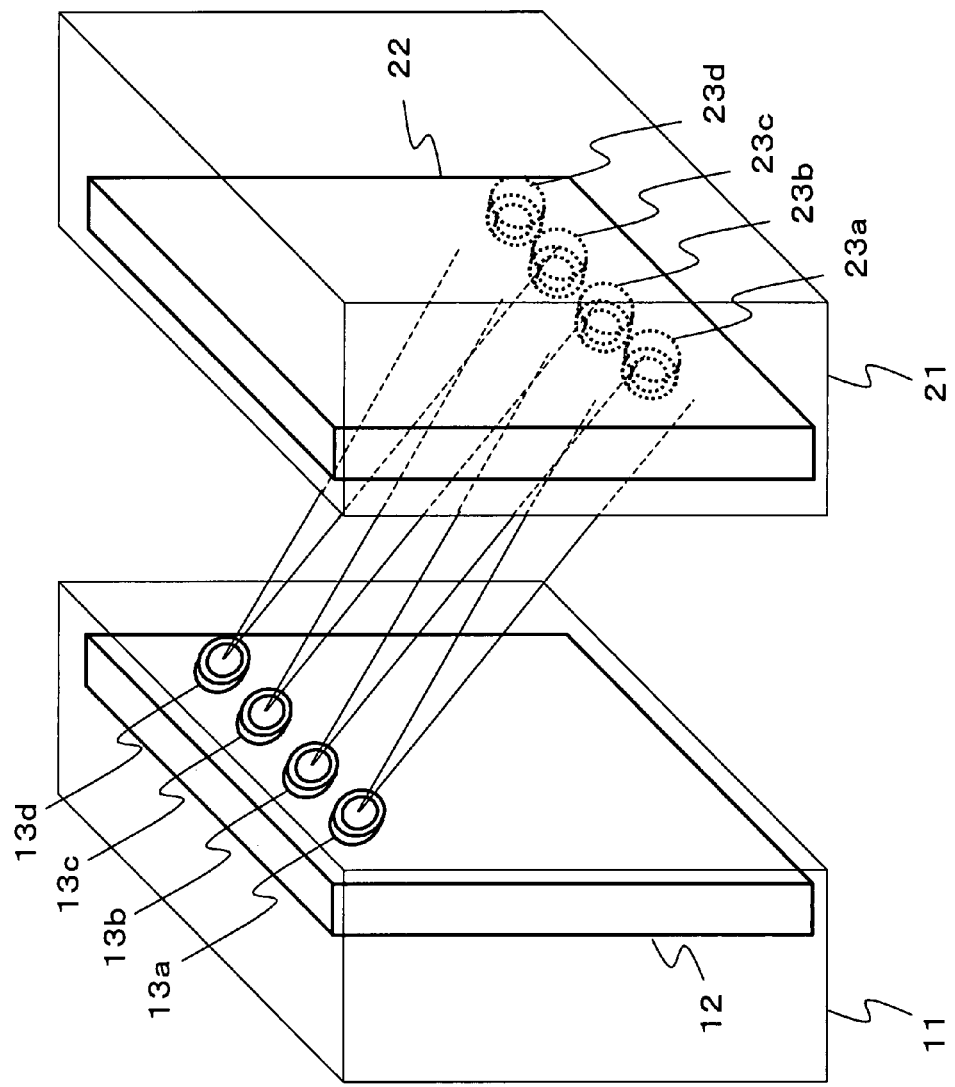
FIG. 8 is a perspective view illustrating an optical wireless transmission system according to a second embodiment of the present invention.

FIG. 8 is a perspective view illustrating an optical wireless transmission system according to the second embodiment of the present invention. In the second embodiment shown in FIG. 8, the optical transmission section 11 has four light emission sections 13a, 13b, 13c, and 13d provided on the mounting substrate 12, and the optical reception section 21 has four light reception sections 23a, 23b, 23c, and 23d provided on the mounting substrate 22.

A positional relationship between the light emission section 13a and the light reception section 23a is the same as the positional relationship described for the first embodiment. Similarly, a positional relationship between the light emission section 13b and the light reception section 23b, a positional relationship between the light emission section 13c and the light reception section 23c, and a positional relationship between the light emission section 13d and the light reception section 23d are the same as the positional relationship described for the first embodiment.

Third Embodiment

Figure 9:
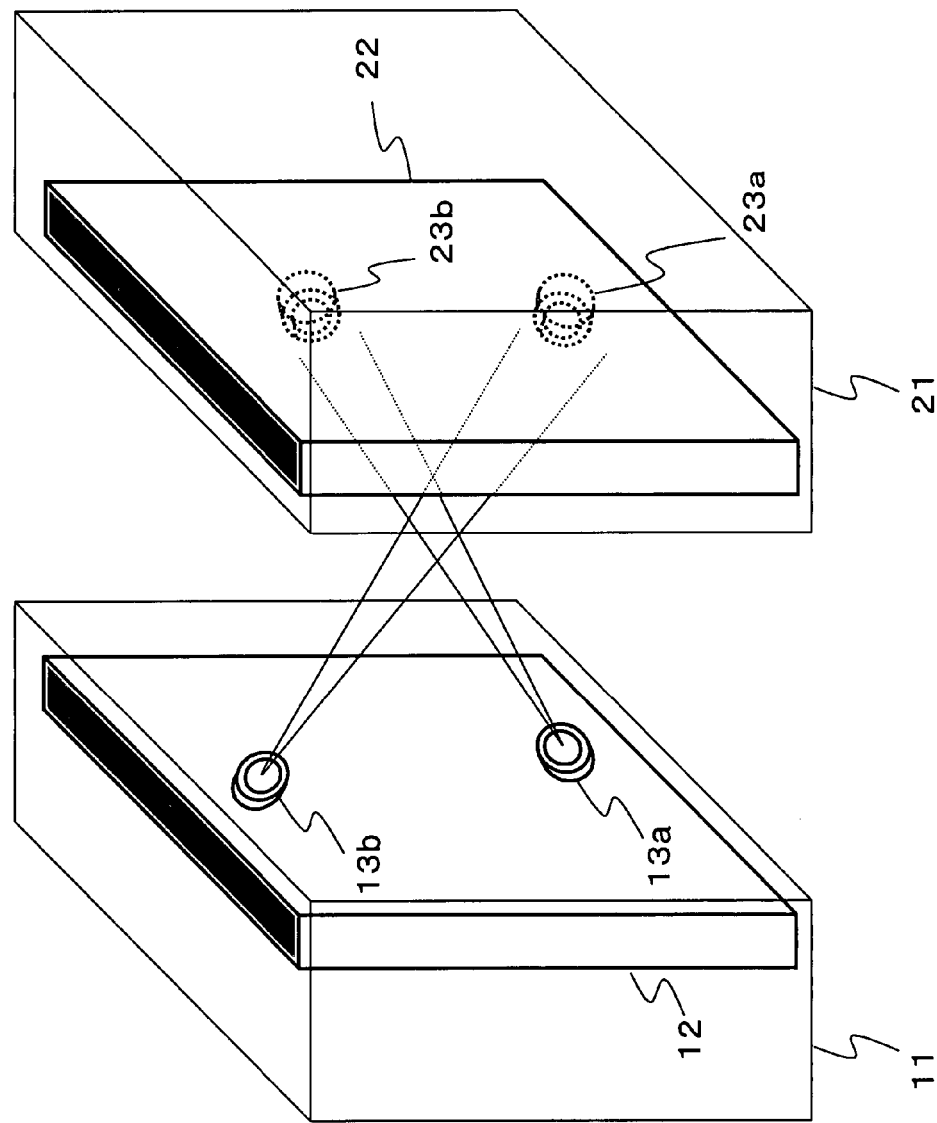
FIG. 9 is a perspective view illustrating an optical wireless transmission system according to a third embodiment of the present invention.

FIG. 9 is a perspective view illustrating an optical wireless transmission system according to the third embodiment of the present invention. In the third embodiment shown in FIG. 9, the optical transmission section 11 has two light emission sections 13a and 13b provided on the mounting substrate 12, and the optical reception section 21 has two light reception sections 23a and 23b provided on the mounting substrate 22.

A positional relationship between the light emission section 13a and the light reception section 23a, and a positional relationship between the light emission section 13b and the light reception section 23b are the same as the positional relationship described for the first embodiment. Further, the light emission sections 13a and 13b, and the light reception sections 23a and 23b are positioned such that the light beam emitted by the light emission section 13a and the light beam emitted by the light emission section 13b cross each other.

Fourth Embodiment

Figure 10:
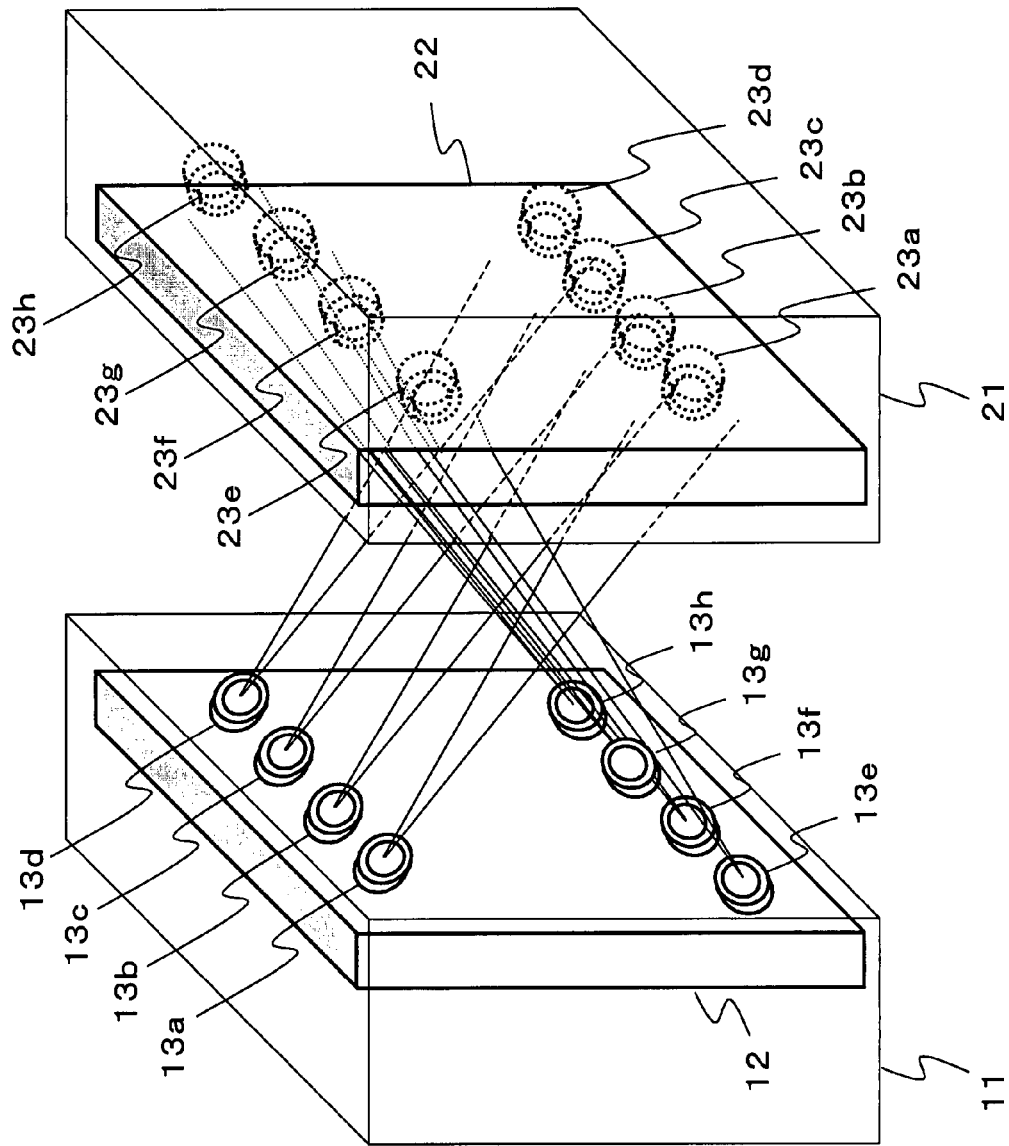
FIG. 10 is a perspective view illustrating an optical wireless transmission system according to a fourth embodiment of the present invention.

FIG. 10 is a perspective view illustrating an optical wireless transmission system according to the fourth embodiment of the present invention. In the fourth embodiment shown in FIG. 10, the optical transmission section 11 has eight light emission sections 13a, 13b, 13c, 13d, 13e, 13f, 13g, and 13h provided on the mounting substrate 12, and the optical reception section 21 has eight light reception sections 23a, 23b, 23c, 23d, 23e, 23f, 23g, and 23h provided on the mounting substrate 22. A structure of the fourth embodiment is a combination of the structure of the second embodiment and the structure of the third embodiment.

Fifth Embodiment

Figure 11:
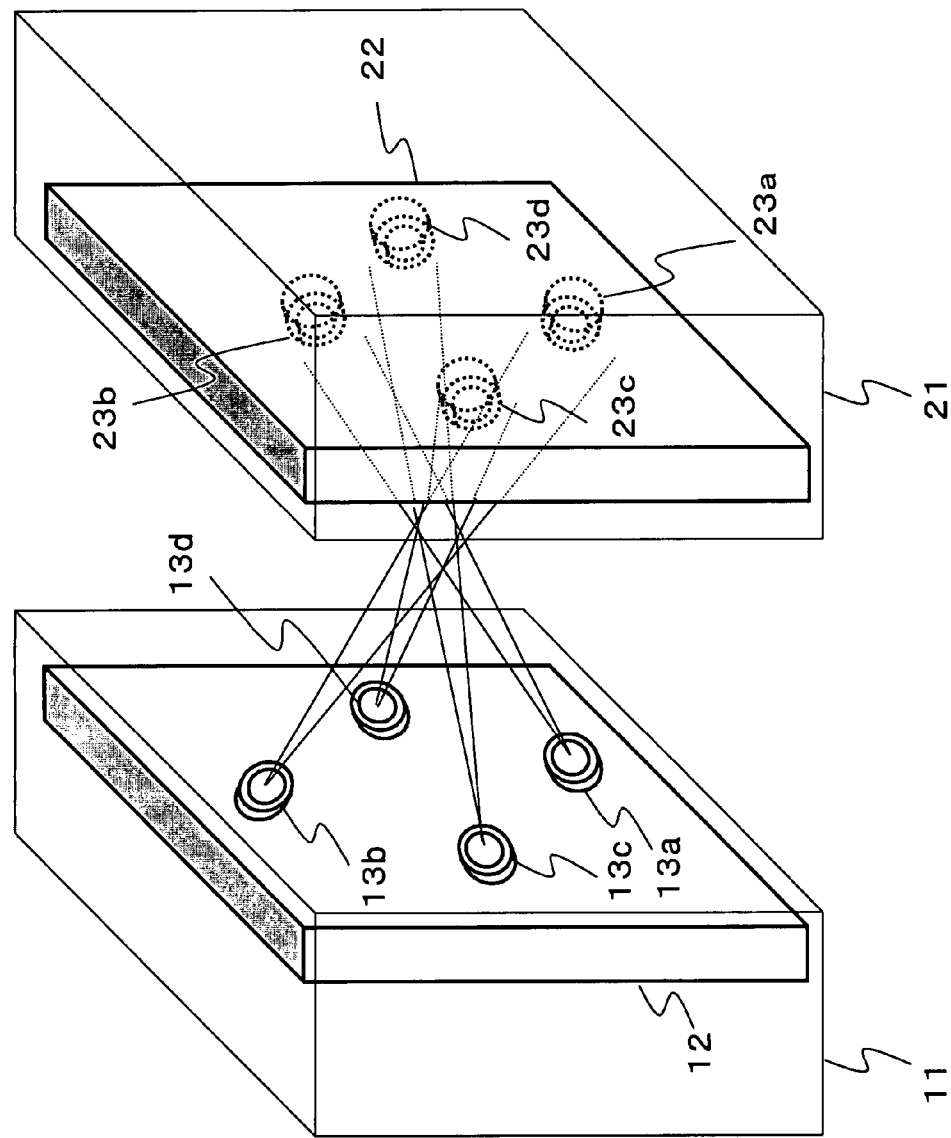
FIG. 11 is a perspective view illustrating an optical wireless transmission system according to a fifth embodiment of the present invention.

FIG. 11 is a perspective view illustrating an optical wireless transmission system according to the fifth embodiment of the present invention. In the fifth embodiment shown in FIG. 11, the optical transmission section 11 has four light emission sections 13a, 13b, 13c, and 13d provided on the mounting substrate 12, and the optical reception section 21 has four light reception sections 23a, 23b, 23c, and 23d provided on the mounting substrate 22.

A positional relationship between the light emission section 13a and the light reception section 23a is the same as the positional relationship described for the first embodiment. Similarly, a positional relationship between the light emission section 13b and the light reception section 23b, a positional relationship between the light emission section 13c and the light reception section 23c, and a positional relationship between the light emission section 13d and the light reception section 23d are the same as the positional relationship described for the first embodiment. Further, the light emission sections 13a, 13b, 13c, and 13d, and the light reception sections 23a, 23b, 23c, and 23d are positioned such that a plurality of light beams emitted by the light emission sections 13a, 13b, 13c, and 13d cross each other at one point.

Sixth Embodiment

Figure 12:
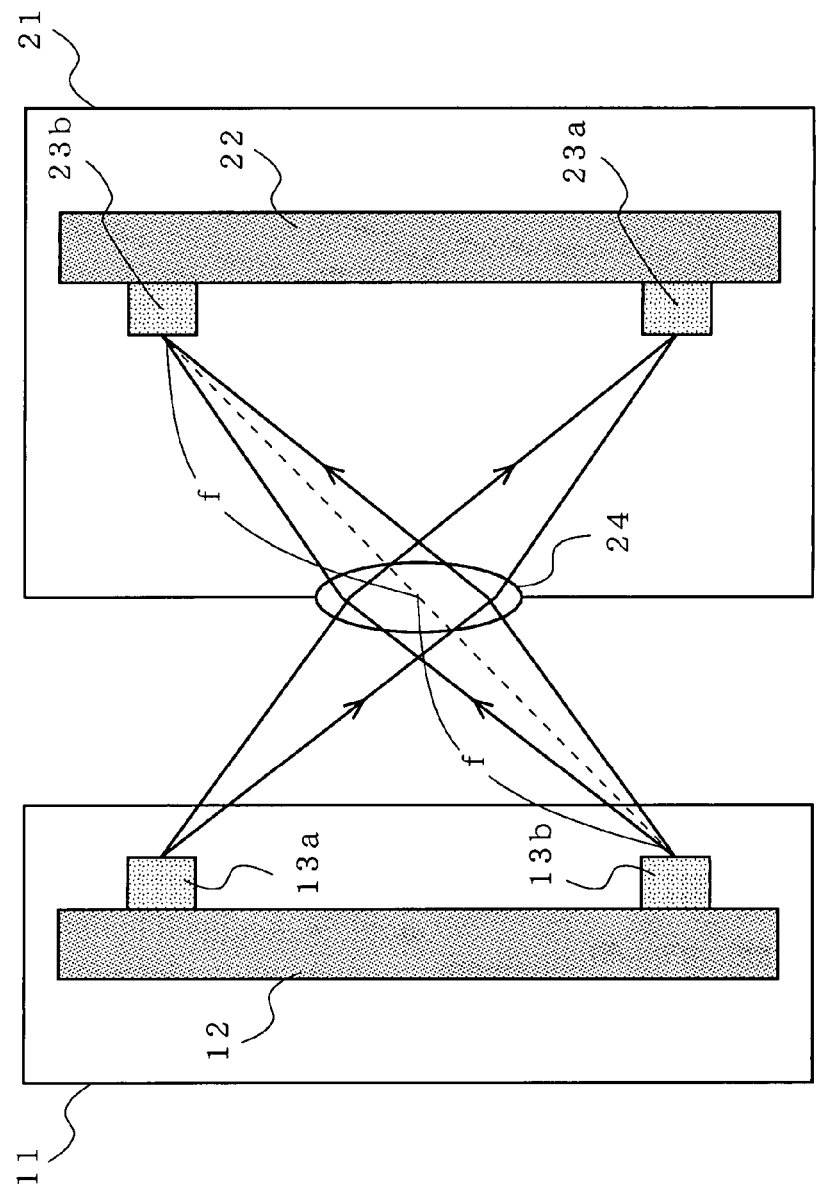
FIG. 12 is a cross-sectional view illustrating a structure of an optical wireless transmission system according to a sixth embodiment of the present invention.

FIG. 12 is a cross-sectional view illustrating a structure of an optical wireless transmission system according to the sixth embodiment of the present invention. As shown in FIG. 12, the optical transmission section 11 of the transmission terminal 10 has the light emission sections 13a and 13b provided on the mounting substrate 12, and the optical reception section 21 of the reception terminal 20 has a lens 24, and the light reception sections 23a and 23b provided on the mounting substrate 22.

A structure of the optical reception section 21 of the sixth embodiment, which is an application of the structure of the third embodiment, is the same as the structure of the optical reception section 21 of the third embodiment except that the optical reception section 21 of the sixth embodiment has the lens 24. The structure of the optical transmission section 11 of the sixth embodiment is the same as the structure (structure examples 1 to 3) of the optical transmission section 11 of the first embodiment.

The lens 24 is used for collecting a light beam transmitted by the transmission terminal 10, and is positioned such that the light reception section 23a is allowed to collect a light beam emitted at the directivity angle θ by the light emission section 13a and the light reception section 23b is allowed to collect a light beam emitted at the directivity angle θ by the light emission section 13b. In other words, the lens 24 is a lens having a focal length f corresponding to half a linear distance between the light emission section 13a and the light reception section 23a.

The structure of the sixth embodiment allows the reduced number of lenses to collect a light with enhanced efficiency, as compared to lenses provided for each light reception section. Further, it is unnecessary to enlarge the size of the lens even when the numbers of the light emission sections and the light reception sections are increased and therefore a necessary mounting area for an optical element is increased. Accordingly, production of a lens can be facilitated, which leads to reduction of cost.

Preferably, an antireflection film is formed on a surface of the lens 24. The antireflection film prevents a light beam emitted by the light emission section 13 from being reflected by the lens 24 and returned to the light emission section 13. Further, by using the antireflection film, a light beam reflected by a surface of the light reception section 23 is prevented from being further reflected by the lens 24 and being returned to the light reception section 23.

Seventh Embodiment

Figure 13:
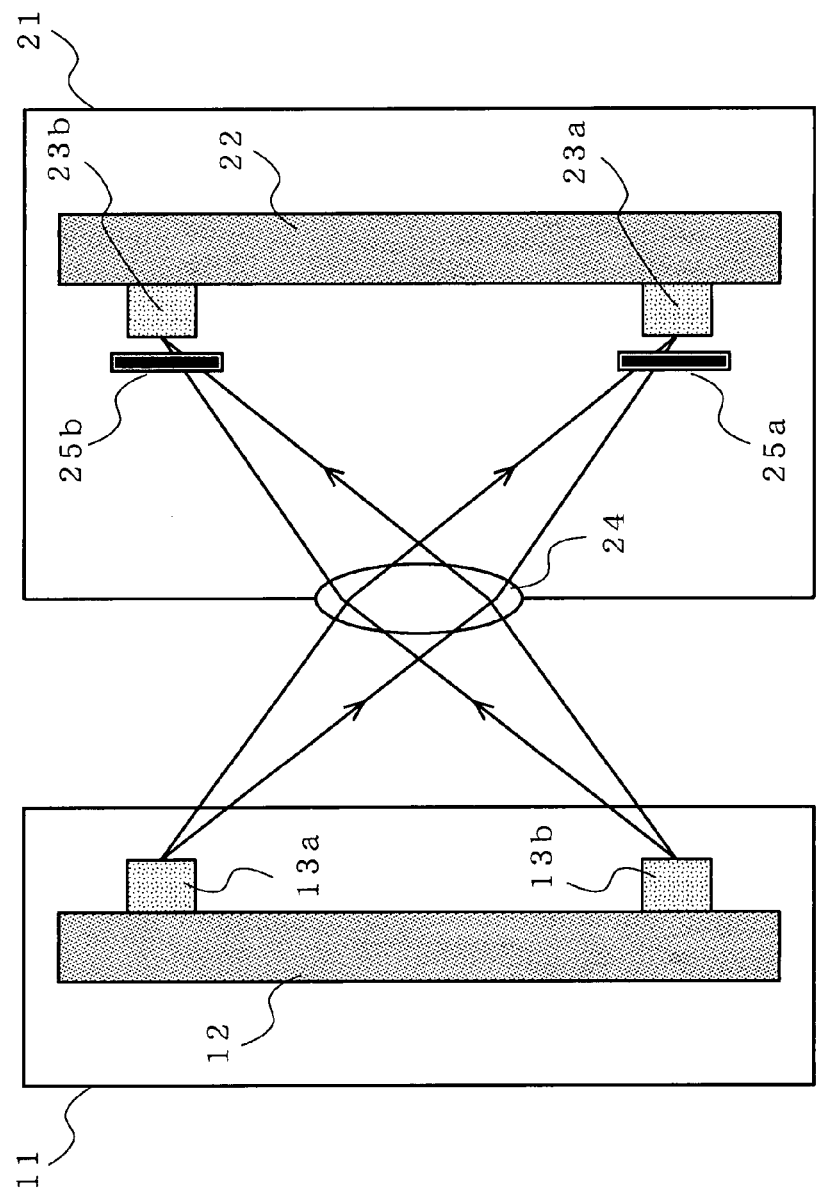
FIG. 13 is a cross-sectional view illustrating a structure of an optical wireless transmission system according to a seventh embodiment of the present invention.

FIG. 13 is a cross-sectional view illustrating a structure of an optical wireless transmission system according to the seventh embodiment of the present invention. As shown in FIG. 13, the optical transmission section 11 of the transmission terminal 10 has the light emission sections 13a and 13b provided on the mounting substrate 12, and the optical reception section 21 of the reception terminal 20 has the light reception sections 23a and 23b provided on the mounting substrate 22, and also has the lens 24, and wavelength filters 25a and 25b.

A structure of the optical reception section 21 of the seventh embodiment is the same as the structure of the optical reception section 21 of the sixth embodiment except that the optical reception section 21 of the seventh embodiment has the wavelength filters 25a and 25b. The structure of the optical transmission section 11 of the seventh embodiment is the same as the structure (structure examples 1 to 3) of the optical transmission section 11 of the first embodiment.

The light emission sections 13a and 13b emit light beams having wavelengths different from each other. The wavelength filter 25a passes only a wavelength of a light beam emitted by the light emission section 13a. The wavelength filter 25b passes only a wavelength of a light beam emitted by the light emission section 13b.

When the wavelength of the light beam emitted by the light emission section 13 is $\lambda_n$, the directivity angle of the light beam is $\theta_n$, and an incidence angle at which the light beam is incident on the light reception section 23 is $\alpha_n$, an allowable passband $\Delta\lambda$ of each of the wavelength filters 25a and 25b satisfies the following expression (2).

$$\Delta\lambda > \sin\alpha_n \times \lambda_n \times \theta_n \quad (2)$$

Figure 14:
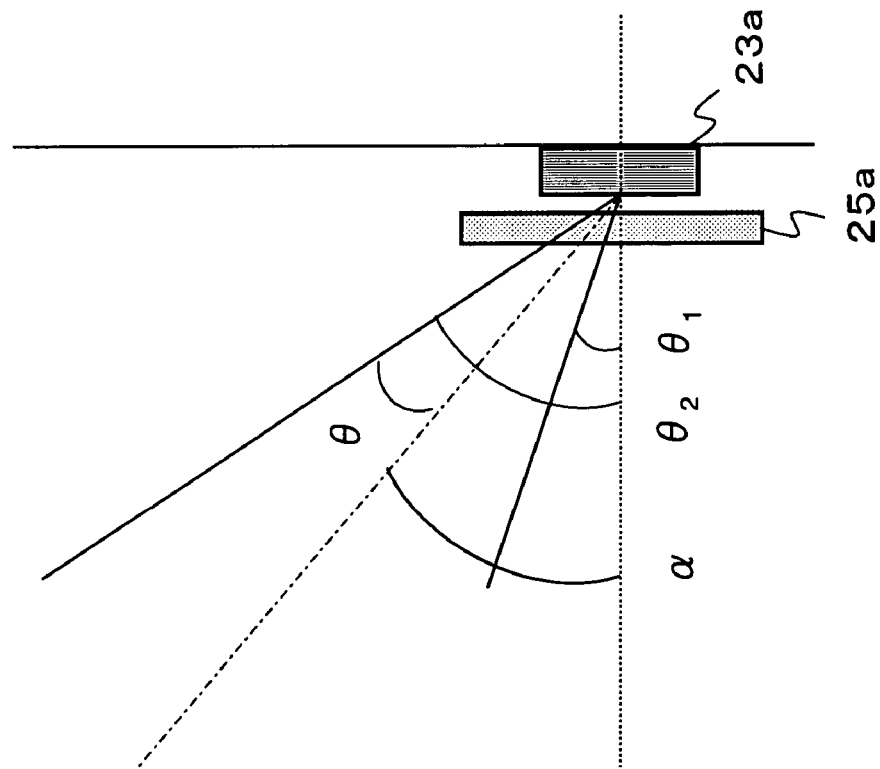
FIG. 14 is a diagram illustrating an effect exerted by a wavelength filters 25a and 25b.

FIG. 14 is a diagram illustrating an effect of the wavelength filters 25a and 25b. FIG. 14 indicates that a light beam emitted at the directivity angle θ by the light emission section 13a is collected by the lens (not shown), and is incident on the light reception section 23a at an angle α. At this time, the light beam is incident on the wavelength filter 23a provided on the light reception section 23a with a deviation of angles $\theta_1$ to $\theta_2$.

Here, a wavelength filter of a typical dielectric multilayer film has a characteristic that when a reference wavelength for a perpendicular incident light is $\lambda_0$, and pass wavelength for the incidence angle α is λ, $\lambda = \cos\alpha \cdot \lambda_0$ is satisfied. See, for example, Tsuruta, Tadao, "Hikari no Enpitsu, 7th edition, published by Kabushiki-Kaisha Shin Gijutsu Communications on Jun. 20, 1989, p. 167. Accordingly, the wavelength filter is designed so as to pass a desired wavelength $\lambda_0$ at a predicted incidence angle α so as to minimize a loss. However, there is a problem that, when the light beam has components of the angles $\theta_1$ to $\theta_2$, the larger the deviation from the reference incidence angle α is, the larger a pass loss to a light of the wavelength $\lambda_0$ is. In general, the wavelength filter is designed so as to widen a pass wavelength thereof. However, when the pass wavelength bandwidth is too wide, a light beam emitted from a light emission section other than a corresponding light emission section passes through the wavelength filter, thereby degrading a function of the wavelength filter. Therefore, it is preferable that a light beam having a minimized directivity angle is incident on the wavelength filter so as to narrow the passband of the wavelength filter. Accordingly, it is preferable that a distance between the light emission section and the light reception section operating in conjunction with each other is maximized such that an area of the lens 24 illuminated by the light beam is prevented from being reduced, and the directivity angle θ is reduced.

For example, a case where an emission wavelength of each of the light emission sections 13a and 13b is 850 nm, the distance between the optical transmission section 11 and the optical reception section 21 is 1 cm, and the diameter of the area of the lens 24 illuminated by the light beam is 5 mm, will be described.

In this case, when the distance between the light emission section 13a and the light emission section 13b is 5 mm, the optical wireless transmission system is designed such that the incidence angle of an optical axis is about 26.6 degrees, and the directivity angle is 12.5 degrees, so that a maximum shift amount of the pass wavelength is 22.7 nm. On the other hand, when the distance between the light emission section 13a and the light emission section 13b is 10 mm, the optical wireless transmission system is designed such that the incidence angle of an optical axis is about 45 degrees, and the directivity angle is 8.1 degrees, so that a maximum shift amount of the pass wavelength is 8.54 nm. Therefore, in the latter case, the wavelength spacing can be narrowed when wavelengths are multiplexed, thereby facilitating wavelength setting in system design.

In the structure of the seventh embodiment, even when a light beam emitted by the light emission section is incident on a light reception section other than a target light reception section due to, for example, surface reflection by the lens or the light reception section, the wavelength filter enables attenuation of unnecessary light. Therefore, it is possible to reduce degradation of the transmission characteristic.

The embodiments as described above are only examples. The number of the light emission sections 13 and the number of the light reception sections 23 may be optionally determined. For example, the number of light emission sections 13 may be larger than the number of light reception sections 23 so as to ensure a wide communication area. The number of light reception sections 23 may be larger than the number of light emission sections 13 so as to obtain a reception signal of a high intensity by combining the wavelengths of the received signals.

Further, all data signals transmitted by a plurality of the light emission sections 13 may be equal to each other, only some of the data signals may be equal to each other, or all the data signals may be different from each other. Further, all the light beams from a plurality of the light emission sections 13 may have the same emission angle, only some of the light beams from the plurality of the light emission sections 13 may have the same emission angle, or all the light beams from the plurality of the light emission sections 13 may have emission angles which are different from each other.

In each of the embodiments described above, the optical transmission section 11 is included only in the transmission terminal 10, and the optical reception section 21 is included only in the reception terminal 21. However, each of the transmission terminal 10 and the reception terminal 21 could include both the optical transmission section 11 and the optical reception section 21 so as to enable bidirectional communication therebetween.

Further, the structure of the optical wireless transmission system shown in each of FIGS. 1 and 2 is an exemplary structure. The optical wireless transmission system may have any system configuration for, or be structured in any manner for, allowing the optical transmission section 11 and the optical reception section 21 to be properly positioned in a foolproof manner. For example, the transmission terminal 10 may include a retractable projection, corresponding to the terminal fixing auxiliary component 30, which allows the optical transmission section 11 and the optical reception section 21 to be properly positioned in a foolproof manner.

Further, when a plurality of light beams are incident, the optical wireless transmission system is preferably designed such that a plurality of optical axes are prevented from being included in a circular area which has the diameter of 7 mm and is distanced by 10 cm from the plurality of light sources (light emitting elements), in accordance with the international laser safety standard "IEC60825-1". This is because, under a light exposure condition satisfied when a distance between human eyes and the light sources is 10 cm, a risk of causing retina disorder in a human eye is maximized. When the distance between a human eye and the light sources is shorter than 10 cm, a retinal image is blurry, thereby reducing the risk.

Figure 15:
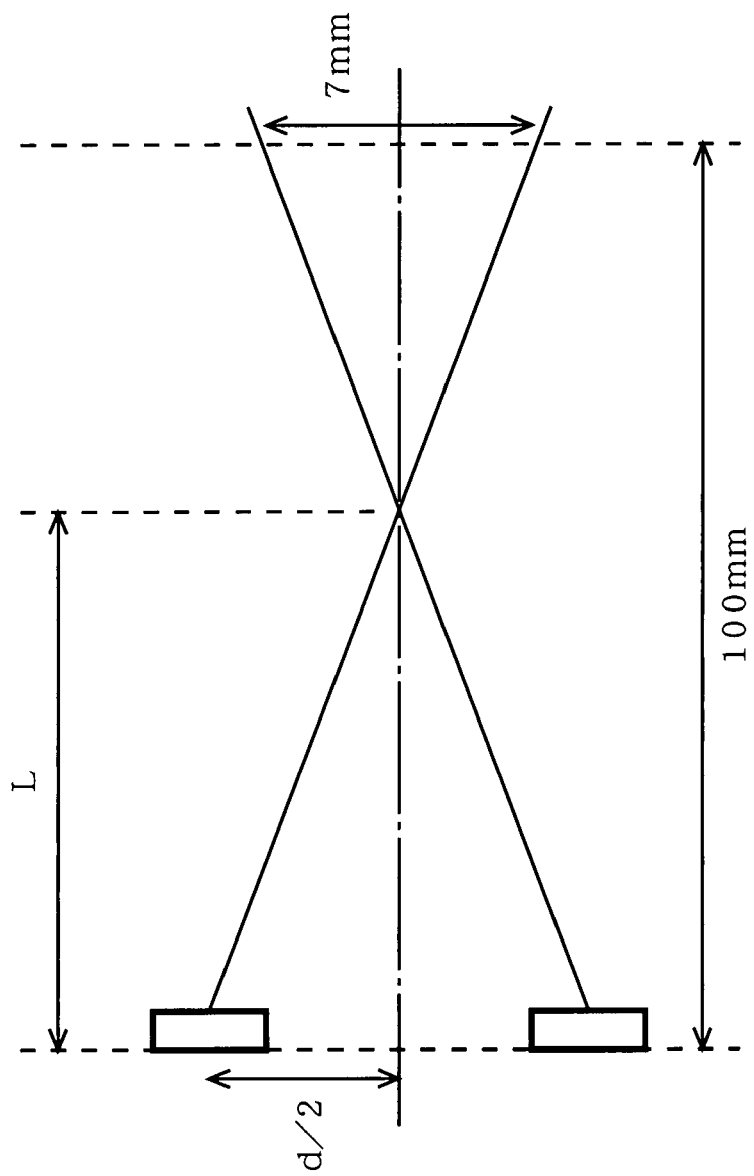
FIG. 15 is a diagram illustrating an exemplary specific design of the optical wireless transmission system according to the present invention.
Figure 16:
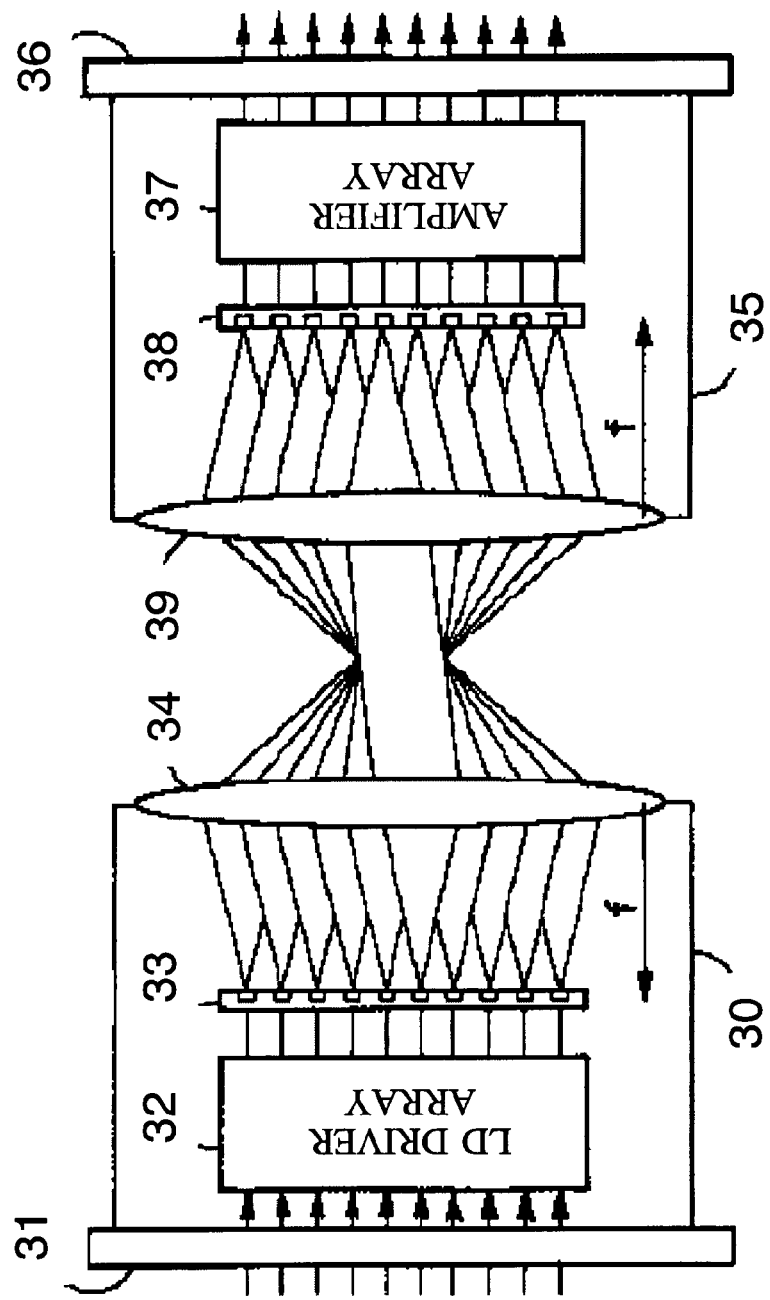
FIG. 16 is a diagram illustrating a structure of a conventional optical space connection device disclosed in Patent Document 1.
Figure 17:
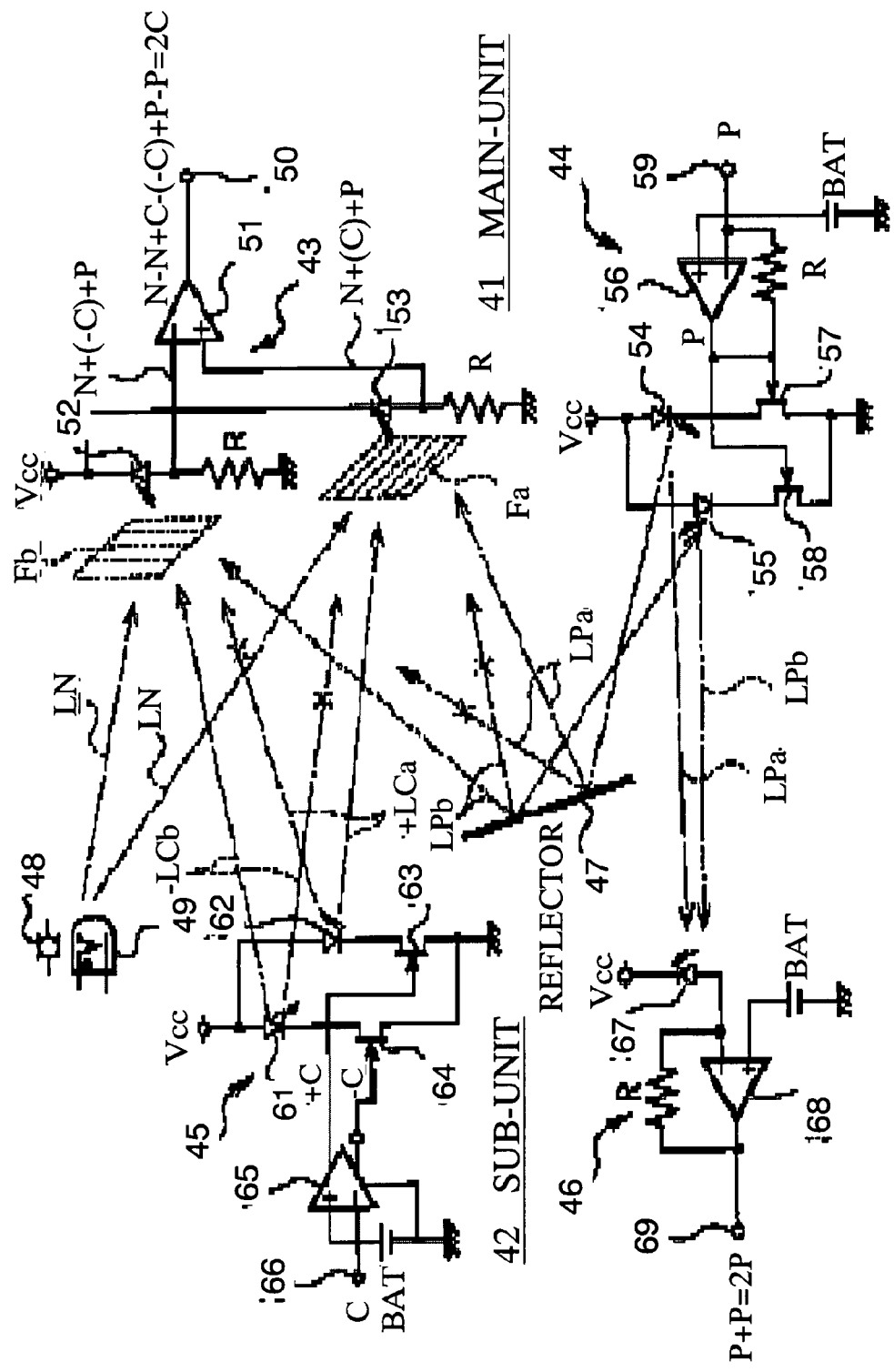
FIG. 17 is a diagram illustrating a structure of a conventional optical wireless transmission system disclosed in Patent Document 2.

Specifically, when a distance between two light sources is d (d>0.15 mm), it is preferable that a distance L from the two light sources to an intersection of optical axes of the light beams emitted by the two light sources satisfies the following expression (3) (FIG. 15).

$$L<(100\times d)/(7+d) \quad (3)$$

The optical wireless transmission system is designed such that a spot on which the light power is most highly concentrated is distanced by 10 cm or less from the light sources, and the light reception section is positioned at the spot, so as to satisfy expression (3). Thus, the light reception section is capable of obtaining the light beam powers from the plurality of the light sources under a condition safe for human eyes without reducing the light beam powers.

While the invention has been described in detail, the foregoing description is in all aspects illustrative and not restrictive. It is understood that numerous other modifications and variations can be devised without departing from the scope of the invention.

What is claimed is:

1. An optical wireless transmission system for performing data communication by using light transmitted in free space, the optical wireless transmission system comprising:
   a transmission terminal having at least one light emission section operable to emit light;
   a reception terminal having at least one light reception section operable to receive light; and
   a terminal fixing auxiliary component for allowing the transmission terminal and the reception terminal to be mounted thereon, and fixing the at least one light emission section and the at least one light reception section so as to satisfy a predetermined positional relationship therebetween,
   wherein when the transmission terminal and the reception terminal are mounted on the terminal fixing auxiliary component, the at least one light emission section and the at least one light reception section are positioned such that light emitted by the at least one light emission section is prevented from being reflected by the at least one light reception section in a direction of the at least one light emission section,
   wherein a light emission section of the at least one light emission section and a light reception section of the at least one light reception section operate in conjunction with each other, and
   wherein in a case where the at least one light emission section and the at least one light reception section are positioned in parallel and facing each other by mounting the transmission terminal and the reception terminal on the terminal fixing auxiliary component, and L is a distance in a perpendicular direction between the light emission section and the light reception section operating in conjunction with each other, W is a distance in a parallel direction between the light emission section and the light reception section operating in conjunction with each other, θ is a directivity angle of light emitted by the light emission section operating in conjunction with the light reception section, and α is an illuminating angle of light emitted by the light emission section operating in conjunction with the light reception section with respect to the perpendicular direction between the transmission terminal and the reception terminal, α satisfies α>tan$^{-1}$(W/2L)+θ.

2. The optical wireless transmission system according to claim 1, wherein each light emission section of the at least one light emission section includes:
   a light emitting element operable to emit light in accordance with communication data; and
   an optical fiber connected to the light emitting element, the optical fiber operable to collect light emitted by the light emitting element and to emit light emitted by the light emitting element into free space.

3. The optical wireless transmission system according to claim 1, wherein each light emission section of the at least one light emission section includes:
   a light emitting element operable to emit light in accordance with communication data; and
   an optical wave guide substrate connected to the light emitting element, the optical wave guide substrate operable to emit light emitted by the light emitting element into free space via an optical wave guide.

4. The optical wireless transmission system according to claim 1,
   wherein the at least one light emission section comprises a plurality of light emission sections,
   wherein the reception terminal further includes a lens operable to collect light incident thereon, and
   wherein each light reception section of the at least one light reception section includes at a light receiving element operable to receive light collected by the lens.

5. The optical wireless transmission system according to claim 1,
   wherein the at least one light emission section comprises a plurality of light emission sections, wherein the reception terminal further includes a lens operable to collect light incident thereon, and wherein each light reception section of the at least one light reception section includes:
- a wavelength filter operable to pass only light of a predetermined wavelength from the light collected by the lens; and
- a light receiving element operable to receive light which has passed through the wavelength filter.

6. The optical wireless transmission system according to claim 5, wherein a wavelength of the light emitted by a respective light emission section of the plurality of light emission sections is $\lambda_n$, a directivity angle of the light from the respective emission section is $\theta_n$, and an incidence angle at which the light from the respective emission section is incident on the at least one light reception section is $\alpha_n$, an allowable passband $\Delta\lambda$ of the wavelength filter satisfies $\Delta\lambda > \sin\alpha_n \times \theta_n$.

7. The optical wireless transmission system according to claim 1, wherein the reception terminal further includes at least one second light emission section operable to emit light into free space, wherein the transmission terminal further includes at least one second light reception section operable to receive light emitted by the reception terminal, and wherein when the transmission terminal and the reception terminal are mounted on the terminal fixing auxiliary component, the at least one second light emission section and the at least one second light reception section are positioned such that light emitted by the at least one second light emission section is prevented from being reflected by the at least one second light reception section a direction of the at least one second light emission section.

8. The optical wireless transmission system according to claim 1, wherein the at least one light emission section emits a plurality of light beams, and wherein at least two of the plurality of light beams emitted by the at least one light emission section are collected by any one of the at least one light reception section.

9. The optical wireless transmission system according to claim 1, wherein the at least one light emission section comprises a plurality of light emission sections and each light emission section of the plurality of light emission sections emits a light beam having an optical axis, and wherein when a distance d between any two light emission sections among the plurality of light emitting sections is larger than 0.15 mm, a distance L from a midpoint between the any two light emission sections to an intersection of optical axes of the light beams emitted by the any two light emission sections satisfies $L < (100 \times d)/(7+d)$.

* * * * *

UNITED STATES PATENT AND TRADEMARK OFFICE
CERTIFICATE OF CORRECTION

PATENT NO. : 7,534,986 B2  Page 1 of 1
APPLICATION NO. : 11/790449
DATED : May 19, 2009
INVENTOR(S) : Mariko Nakaso et al.

It is certified that error appears in the above-identified patent and that said Letters Patent is hereby corrected as shown below:

In column 15, claim 6, line 19, "$\Delta\lambda > \sin\alpha_n \times \theta_{n_2}$" should read "$\Delta\lambda > \sin\alpha_n \times \lambda_n \times \theta_{n_2}$".

Signed and Sealed this

Tenth Day of November, 2009

David J. Kappos
*Director of the United States Patent and Trademark Office*